M. B. JOHNSON.
BOX FOR CARRYING WIRELESS SIGNALING APPARATUS.
APPLICATION FILED OCT. 6, 1910.
996,092.
Patented June 27, 1911.
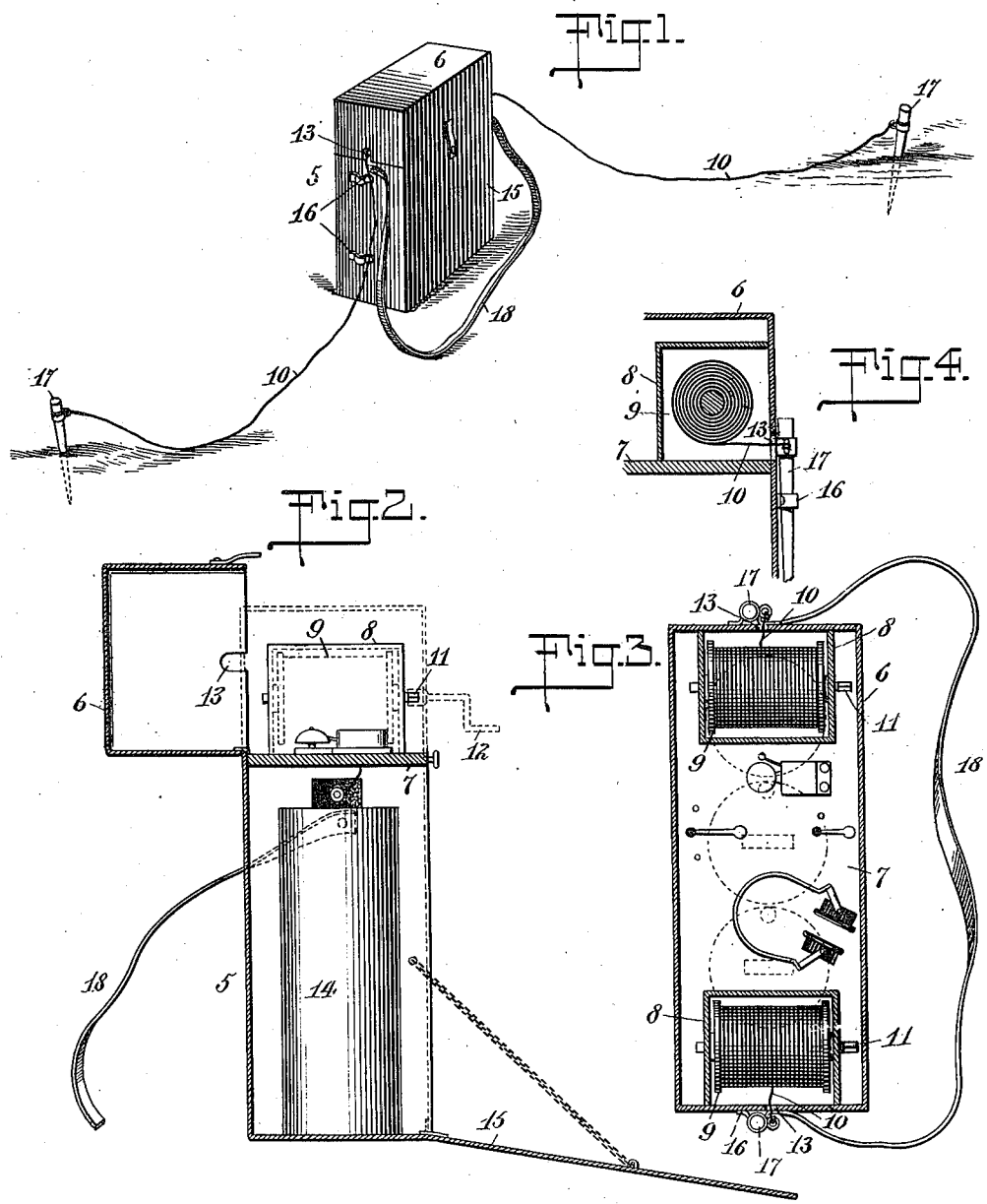

UNITED STATES PATENT OFFICE.

MAURICE BERNAYS JOHNSON, OF SAN ANTONIO, TEXAS.

BOX FOR CARRYING WIRELESS SIGNALING APPARATUS.

996,092. Specification of Letters Patent. Patented June 27, 1911.

Application filed October 6, 1910. Serial No. 585,548.

*To all whom it may concern:*

Be it known that I, MAURICE BERNAYS JOHNSON, a citizen of the United States, and a resident of San Antonio, in the county of Bexar and State of Texas, have made and invented certain new and useful Improvements in Boxes for Carrying Wireless Signaling Apparatus, of which the following is a specification.

My invention relates to an improvement in boxes or receptacles to be used for carrying or transporting wireless telegraph or telephone instruments, the object being to provide an article of this kind which shall be cheap to manufacture, which shall nicely and conveniently contain the instruments to be carried therein, and to which ready access may be had, and which may also be carried conveniently in the hand or by a strap thrown across the shoulder.

With these and other ends in view the invention consists in certain novel features of construction and combinations of parts as will be hereinafter fully described and pointed out in the claims.

In the accompanying drawings, Figure 1 is a view in perspective of my improved box or case shown in its closed adjustment and with the ground wires extending therefrom. Fig. 2 is a vertical sectional view of the same, the top or cover being shown in its open adjustment. Fig. 3 is a horizontal sectional view of the case showing the reels upon which the ground wires are wound. Fig. 4 is a view showing a section taken upon a vertical plane passing through a slot in the cover and one of the reels with which my device is provided.

Referring to the drawings, 5 represents the box or case constructed of wood, leather, or other desired material, and provided with a lid or cover which is hinged thereto in order that the same may be turned or folded backwardly, as illustrated in Fig. 2, whereby access may be had to the upper part or portion of the case.

In the top of the box 5 is secured the plate or platform 7, preferably made of wood, hard rubber or other insulating material, to which is secured the instruments desired to be carried in the box. On this plate 7, and at each end thereof, is secured a frame 8 in which is mounted a reel 9, having a wire, tape or other electric conductor 10 wound or coiled thereon, as illustrated in Fig. 3, the shaft of each reel being provided with a squared end 11, whereby to attach the handle or crank 12 for rotating said reel and winding or coiling thereon the wire or tape 10. From the reels the wires extend through a slot 13 formed in the lid or cover 6 in order that the latter may be opened or closed without interference from said wires when the latter have been unwound from the reels. In the body of the box 5 is contained the battery 14, to which access may be had by lowering the front plate 15 of the box, said front plate 15 being hinged at its lower edge to the box in order that the same may be opened or folded as illustrated in Fig. 2. To the sides of the box 5 are attached or secured the pockets or receptacles 16, in which are fitted, when the device is not in operation, the pegs 17, preferably formed of metal and attached to the outer ends of the conducting wires 10, and designed to be driven into the earth in order to ground said wires. To the box is also secured the strap, belt or handle 18, in order that the case may be conveniently carried in the hand, or by means of said belt passed over the shoulder.

When it is desired to set up the instrument, either wireless telegraph or telephone, the lid or cover 6 is thrown open, as illustrated in Fig. 2; the pegs 17 are then removed from the box or receptacles 16, and the conducting wires or tape 10 unwound from the reels and the pegs driven into the earth to ground said wires. The electrical instruments may then be used in accordance with the purpose for which they may be designed, after which the pegs 17 are withdrawn, and the reels rotated by means of the handle or crank 12 to wind or coil on said reels the tape or wire 10. When completely wound, the pegs 17 are inserted in the receptacles 16, and the cover 6 then closed.

From the foregoing it will be understood that my invention is exceedingly simple, and well adapted for containing and transporting wireless electrical apparatus.

What I claim is:—

1. A case for the transportation of wireless electrical instruments comprising a body portion adapted to contain a battery, a platform closing the upper end of said body portion, a hollow top or cover hinged at the upper end of said body portion and having a slot at each end thereof, two reels secured one at each end of said platform and each of which reels carries an electrical conductor, a metallic peg secured to the end of each of said conductors, the location of the slots aforesaid being such that one of them is adjacent to each of said reels when the cover is closed, and means upon the ends of said case adjacent said slots for supporting said metallic pegs, substantially as described.

2. A case of the character described comprising a box provided with a handle and having a slotted top hinged thereto, said case having a platform secured in the top of the body thereof, reels secured to said platform, and metallic pegs secured to the ends of said conductors, said body being provided with pockets on the outer sides thereof for containing said pegs, substantially as described.

Signed at New York, borough of Manhattan, in the county of New York and State of New York, this 30th day of September, A. D. 1910.

MAURICE BERNAYS JOHNSON.

Witnesses:
A. V. WALSH,
H. M. WHITE.